United States Patent [19]

Norton

[11] Patent Number: 4,512,105
[45] Date of Patent: Apr. 23, 1985

[54] GATE LATCH

[76] Inventor: Dennis J. Norton, 7558 Carriage La., Fort Worth, Tex. 76112

[21] Appl. No.: 577,192

[22] Filed: Feb. 6, 1984

[51] Int. Cl.³ .................. E05B 65/06; E05C 5/02; E05C 1/04
[52] U.S. Cl. ................................. 49/394; 292/57; 292/148
[58] Field of Search .............. 49/394, 395; 292/57, 292/59, 148, 259

[56] References Cited

U.S. PATENT DOCUMENTS

| | | | |
|---|---|---|---|
| 1,496,172 | 6/1924 | Rogers | 292/57 |
| 1,508,029 | 9/1924 | Segal | 292/57 |
| 2,587,167 | 2/1952 | Kelley | 49/394 X |
| 2,928,688 | 3/1960 | Johnson | 49/394 X |
| 3,779,588 | 12/1973 | Raymon | 292/57 |
| 4,114,408 | 9/1978 | Gee | 292/57 X |
| 4,178,024 | 12/1979 | Wagner | 292/57 |
| 4,214,783 | 7/1980 | Boegeman | 292/148 X |

Primary Examiner—Philip C. Kannan
Attorney, Agent, or Firm—Arthur F. Zobal

[57] ABSTRACT

An elongated housing member rectangular in cross section has aligned forward and rear openings formed through opposite ends. The housing has two opposite sides adapted to be connected to a side frame member of a gate with a hollow cross member having an open end located in the rear opening. A bolt located in the housing has a forward end extending through the forward opening and a rear end extending through the rear opening and into the open end of the cross member. A plate connected to the forward end of the housing has a first aperture formed therethrough defining said forward opening and an edge extending beyond a third side of the housing. A slot formed through the third side of the housing has an elongated portion extending along the length of the housing and a short transverse portion extending from the elongated portion next to the plate. A handle connected to the bolt extends through the slot. The handle is movable in the elongated portion of the slot for moving the bolt to its fastening and unfastening positions. The handle is movable in the transverse portion of the slot to a locking position. A second aperture is formed through the plate in line with the elongated portion of the slot between said first aperture and said edge of said plate for receiving a member of a lock for locking the bolt in its fastening position when the handle is in its locking position in the transverse portion of the slot.

6 Claims, 10 Drawing Figures

GATE LATCH

BACKGROUND OF THE INVENTION

There are many different types of gates and latches for fences used for holding livestock. Most latches, however, are not strong enough to hold large animals and are easy to release by tampering.

SUMMARY OF THE INVENTION

It is an object of the invention to provide a gate latch which is strong enough to hold large animals.

It is another object of the invention to provide a gate latch which when locked, is difficult to release by tampering.

It is a further object of the invention to provide a gate latch which does not require precision cutting of a latch supporting member of the gate.

DESCRIPTION OF THE PREFERRRED EMBODIMENT

Figure 1:
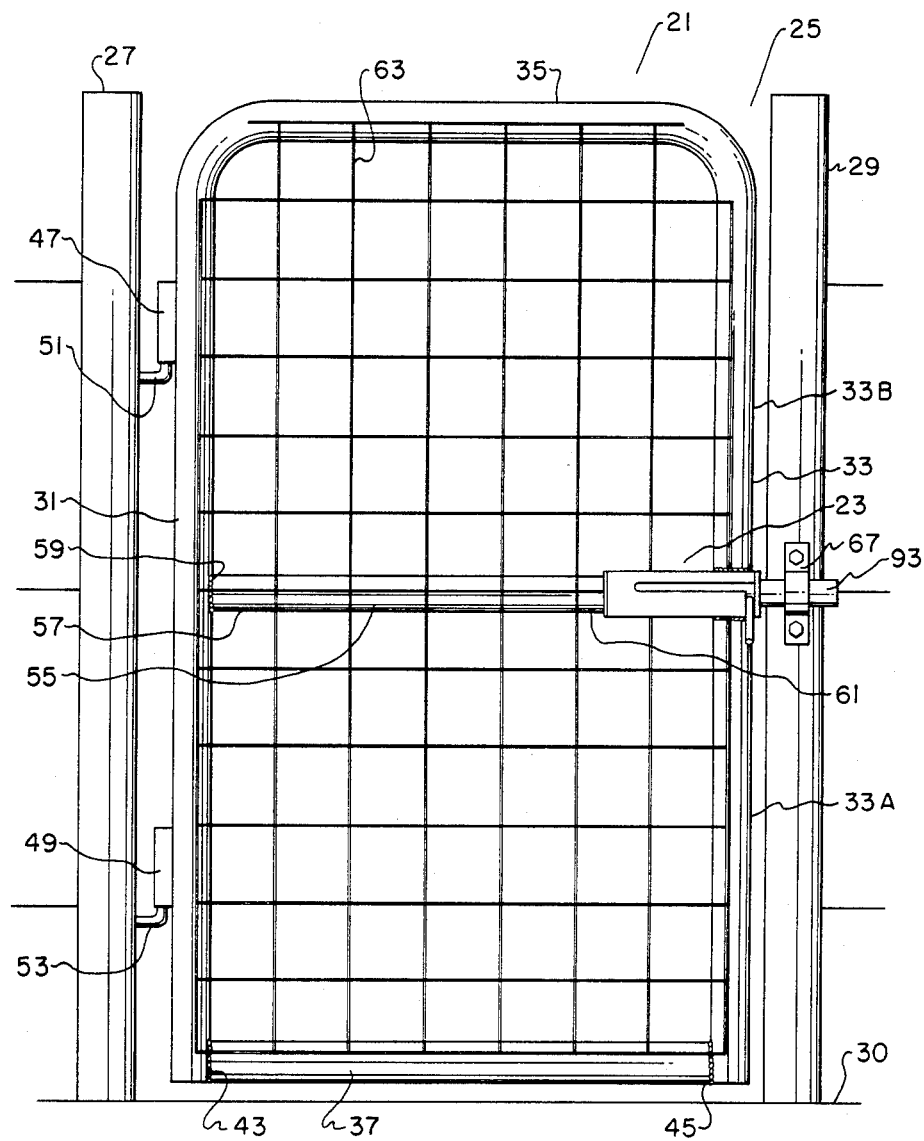
FIG. 1 illustrates a gate and latch of the present invention.
Figure 2:
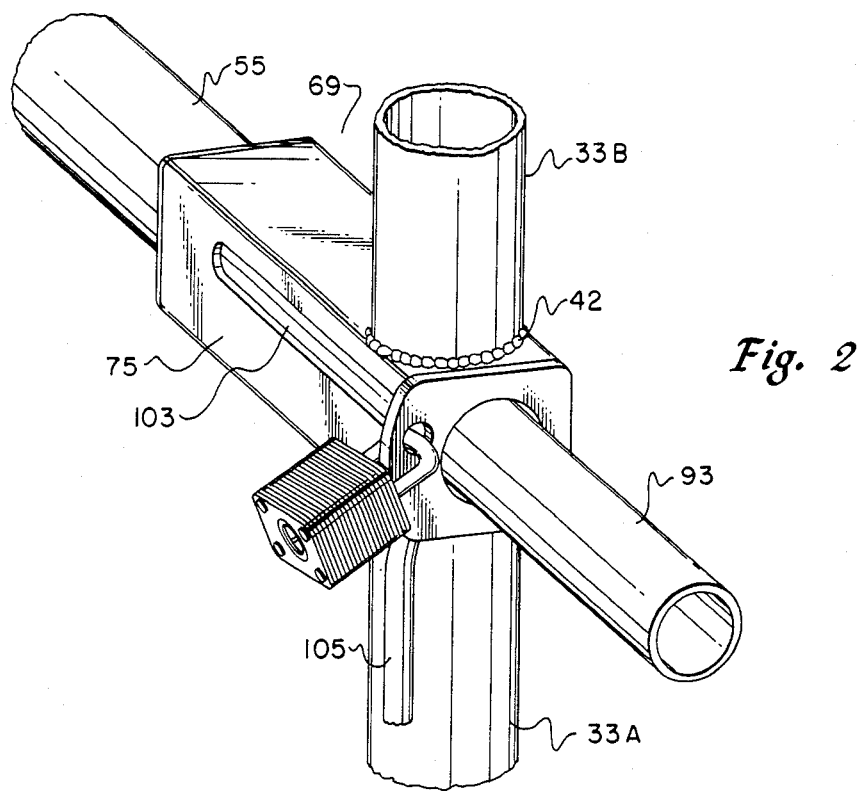
FIG. 2 is a perspective view of the front portion of the latch of FIG. 1.
Figure 3:
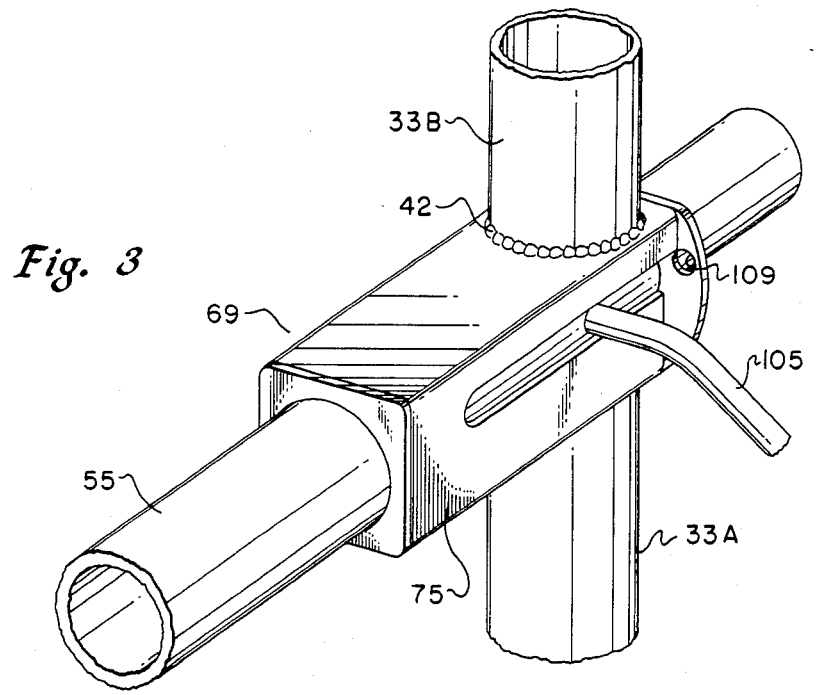
FIG. 3 is a perspective view of the rear portion of the latch of FIG. 1.

Referring now to FIG. 1, there is illustrated the gate 21 and latch 23 of the invention. The gate is used to close an opening 25 between two posts 27 and 29 of a fence used on farms, ranches, for rodeos, etc. Reference number 30 identifies the ground in which the posts 27 and 29 are anchored. The fence may be formed of barbed wire, wood, etc. The gate 21 comprises a rectangular metal frame formed of two side frame members 31 and 33, a top frame member 35, and a bottom frame member 37. Members 31, 33, 35, and 37 are formed of metal pipe or tubing, round in cross section. Member 33 is formed of lower and upper portions 33A and 33B welded at 41 and 42 (see FIG. 9) to the bottom and top sides respectively of the latch 23. Upper portion 33B, member 35, and member 31 are formed of a single member bent to the shape as shown. Member 37 is welded at 43 and 45 to members 31 and 33A respectively. Hollow cylindrical hinge members 47 and 49 are connected to member 31 for receiving the vertical portions of pins 51 and 53 respectively connected to the post 27 whereby the gate 21 may swing to open and closed positions relative to the post 29 when the latch 23 is unfastened. A cross member 55 has one end 57 welded at 59 to member 33 and its other end 61 coupled to the latch 23. A heavy wire mesh 63 is welded to the frame members to cover the gate. Post 29 has a metal strap 67 secured thereto forming an opening or slot between the strap and the post for receiving the bolt of the latch 23 when the gate is closed and the bolt is moved to its fastening position.

Figure 4:
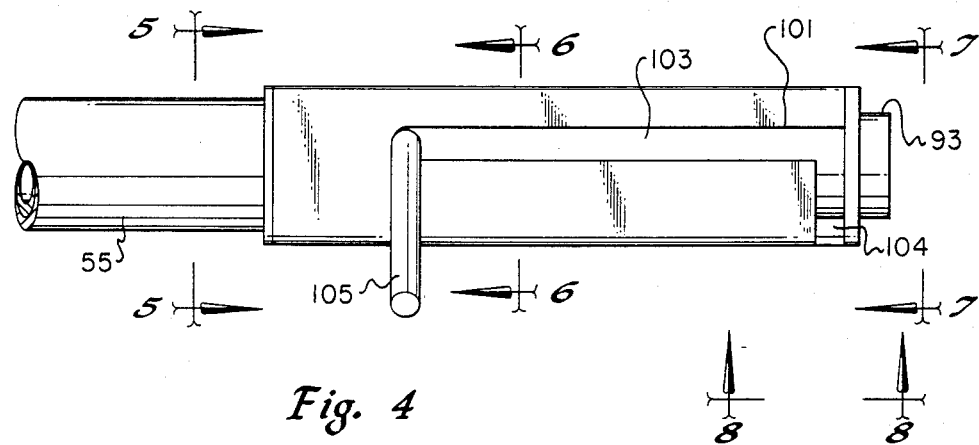
FIG. 4 is a side view of the latch of FIG. 1 before installation on a gate.
Figure 9:
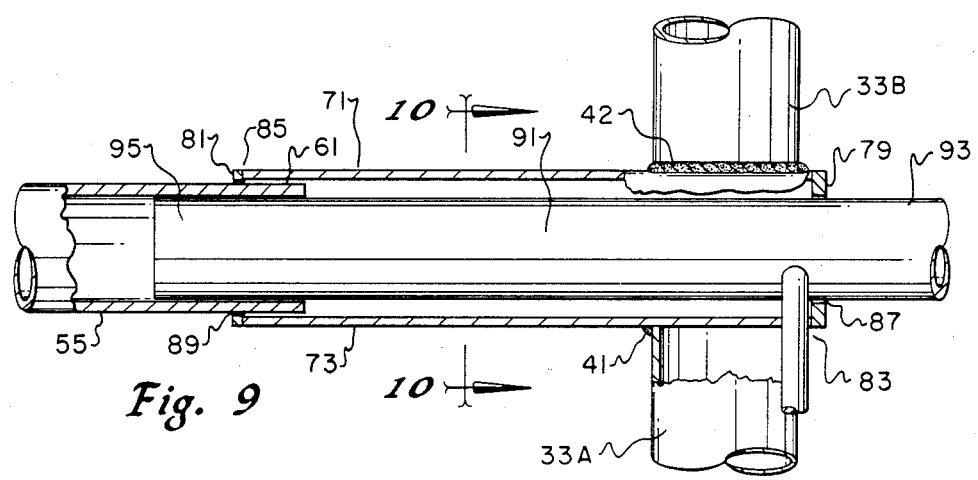
FIG. 9 is a cross sectional view of a portion of the latch of FIG. 4.
Figures 5, 6, 7:
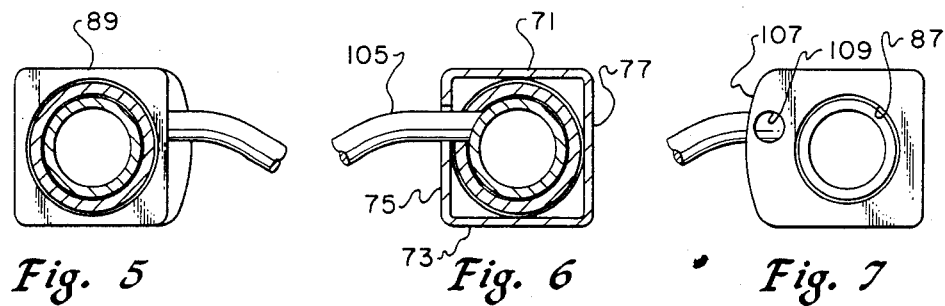
FIG. 5 is a view of FIG. 4 taken along the lines 5—5 thereof.
FIG. 6 is a view of FIG. 4 taken along the lines 6—6 thereof.
FIG. 7 is a view of FIG. 4 taken along the lines 7—7 thereof.
Figure 10:
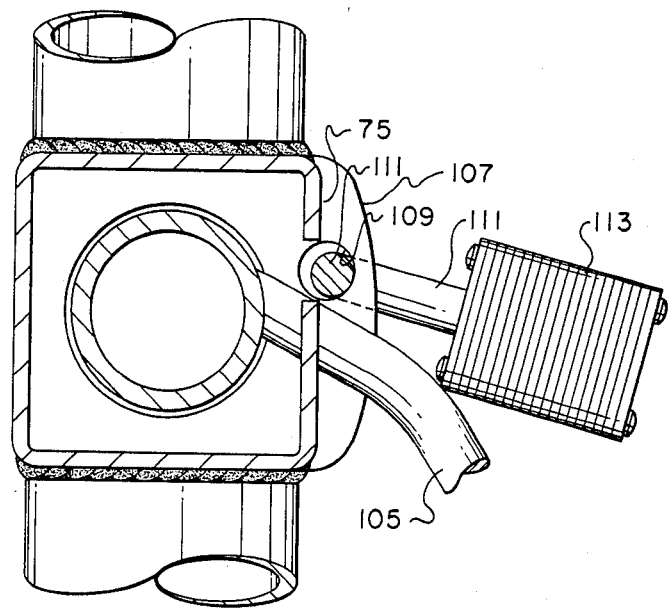
FIG. 10 is an enlarged view of FIG. 9 taken along the lines 10—10 thereof.
Figure 8:
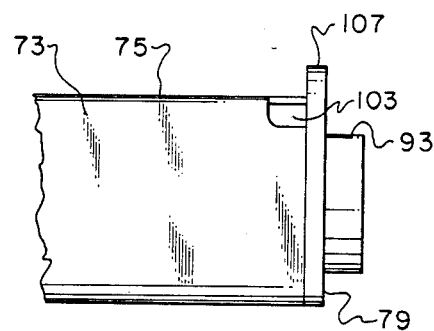
FIG. 8 is a view of FIG. 4 taken along the lines 8—8 thereof.

Referring now to FIGS. 2–10, the latch 23 comprises an elongated hollow metal housing 69 square in a cross section perpendicular to its length such that it has two flat upper and lower walls 71 and 73 and two flat side walls 75 and 77. Metal plates 79 and 81 are welded to the forward and rear ends 83 and 85 respectively of the housing. Plates 79 and 81 have aligned circular apertures 87 and 89 formed therethrough. Aperture 89 has a diameter greater than the diameter of aperture 87. An elongated bolt 91 is located in the housing 69 with its forward end 93 extending through the forward aperture 87 and its rear end 95 extending through the rear aperture 89 of the housing 69. The bolt 91 is circular in cross section and in the preferred embodiment is a hollow metal tube or pipe. A slot 101 is formed through the side wall 75 of the housing. The slot 101 comprises an elongated portion 103 extending from the forward end 83 of the housing rearward toward the rear end 85. A shortened transverse portion 104 of the slot 101 is located next to the plate 79 and extends transversely from the elongated portion 103 as shown in FIG. 4. As shown in FIG. 8, the transverse slot portion 104 also extends partially into the bottom wall 73. A metal handle 105 is connected to the bolt 91 and extends through the slot 101. The handle 105 is movable in the elongated portion 103 of the slot 101 to move the bolt 91 forward to a fastening position and rearward to an unfastening position. When the bolt 91 is located at its forward fastening position, the handle 105 may be moved into the transverse portion 104 of the slot 101 for locking purposes. As shown in FIGS. 2, 3, 5, 7, 8, and 10, the front plate 79 has an edge 107 that extends beyond the side wall 75 of the housing. A second small aperture 109 is formed through the front plate 79 between the front opening 87 and its edge 107 and in line with the elongated portion 103 of the slot 101 for receiving the U-shaped member 111 of a padlock 113. When the handle 105 is moved downward in the transverse portion 104 of the slot, the U-shaped member 111 of the lock 113 may be inserted through the aperture 109 for locking the handle 105 in the transverse portion 104 of the slot and the bolt 91 in the fastening position. When the gate is closed and the bolt 91 is located in its fastening position, the bolt 91 will extend through an opening or slot formed between the metal strap 67 and the post 29 for fastening the gate to the post 29. When the handle 105 is in the transverse slot portion 104 below the aperture 109 and member 111 of lock 113 extends through the aperture 109 and is locked in place, it is difficult to release the latch by tampering. In this respect, the latch housing 69 is formed of heavy gauge metal and one cannot cut the handle 105 from the outside of the housing 69 to release the latch. For example, the extending edge 107 prevents one from cutting the handle 105 inward of the edge 107 with a metal rod cutting device and if the handle 105 is cut flush with the edge 107, the U-shaped member 111 of the lock 113 extending through the aperture 109 prevents the remaining portion of the handle 105 from being moved to the elongated portion 103 of the slot thereby preventing release of the bolt 91. By forming the housing 69 rectangular in cross section, it has been found that the slot 101 does not weaken the housing which occurs if the housing were cylindrical and had the slot 101 formed through its wall. Thus a very strong latch is provided for holding large animals such as bulls, etc. In assembling the gate, the open end 61 of the hollow cross member 55 is located in the opening 89 of the housing 69 as shown in FIG. 9, and the rear end 95 of the bolt 91 is located within the open end 61 of the cross member 55. In both the fastening and unfastening positions, the bolt 91 will have its forward end extending through the forward opening 87 and its rear end extending through the rear opening 89 and located within the open end 61 of the cross member 55. By allowing the end 61 of the cross member 55 to be located within the opening 89 of the rear end of the housing 69 and with the rear end 95 of the bolt 91 slidable within the open end 61 of the cross member 55, the gate can be constructed without the necessity of the cross member 55 being cut to a precise length which would be required if its end 61 were to be abutted against the rear end of the housing 69 and welded thereto. The only weld required for the cross member 55 is at 59. Location of the end 61 of the cross member 55 within the rear opening 89 of the housing 69 and with the rear end of the bolt 91 slidable within the open end 61 of the cross member 55 provides support for the end 61 of the cross member 55. The bottom and top sides 73 and 71 of the housing 69 at its forward end are welded at 41 and 42 to the lower and upper frame member portions 33A and 33B respectively.

In one embodiment, the frame of the gate comprising members 31, 33, 35, and 37 is formed of galvanized soft low carbon steel having an outside diameter of 1.9 inches. The cross member 55 is formed of the same material and has an outside diameter of 1.66 inches. The outside dimensions of the housing 69 are 8 inches by 2 inches by 2 inches. It is formed of galvanized soft low carbon steel. The bolt 93 has a length of about 15 inches and an outside diameter of about 1 5/16 of an inch. It also is formed of galvanized soft low carbon steel. In its fastening position, the bolt 91 extends about 6 inches forward of plate 79 and about one inch rearward of plate 81. In its unfastening position, the bolt extends about ½ of an inch forward of plate 79 and about 6½ inches rearward of plate 81. The elongated portion 103 of the slot 101 is about 6 inches long and its rear end terminates short of the end 61 of the cross member 55. The forward opening 87 of the housing has a diameter of about 1 6/16 of an inch and the rear opening 89 of the housing 69 has a diameter of about 1 10/16 of an inch. The padlock 113 which may be employed is of the commercial type which is very difficult to release by tampering. It is to be understood that the latch 23 and the frame members of the gate 21 may have dimensions different from those described above.

I claim:

1. A gate, comprising:
a generally rectangular shaped frame comprising two side frame members, an upper frame member, and a lower frame member,
one of said side frame members being used to support hinge means for pivotally coupling said frame to a structural means such that said frame may swing to open and closed positions relative to another structural means,
a hollow elongated member having first and second aligned openings formed through first and second opposite ends respectively,
said hollow elongated member at said first end being connected to said other side frame member such that said second end of said hollow elongated member extends toward said one side frame member,
an intermediate hollow frame member having an open end located in said second opening of said hollow elongated member and an opposite end connected to said one side frame member,
an elongated bolt means located in said hollow elongated member,
said bolt means having a first end extending through said first opening and a second end extending through said second opening and into said open end of said intermediate hollow frame member,
said elongated bolt means being movable between a fastening position and an unfastening position,
in said fastening position, said first end of said bolt means extends beyond said first end of said hollow elongated member a given distance for insertion into an opening formed in the other structural means for fastening said frame to the other structural means,
in said unfastening position, said bolt means being located closer to said one side frame member than in said fastening position such that said first end of said bolt means can be withdrawn from the opening formed in the other structural means for unfastening said frame from the structural means.

2. The gate of claim 1, comprising:
an elongated slot formed through the wall of one side of said hollow elongated member,
said slot extending from said first end of said hollow elongated member toward said second end of said hollow elongated member,
a handle connected to said bolt means and extending through said slot,
said handle being movable in said elongated slot for moving said bolt means to its fastening and unfastening positions.

3. The gate of claim 1, comprising:
plate means connected to said first end of said hollow elongated member and having a first aperture formed therethrough defining said first opening of said hollow elongated member,
said plate means having an edge extending beyond one side of said hollow elongated member,
a slot formed through the wall of said one side of said hollow elongated member,
said slot having an elongated portion extending from said first end of said hollow elongated member toward said second end of said hollow elongated member,
said slot having a short portion next to said plate means extending transversely from said elongated portion,
a handle connected to said bolt means and extending through said slot,
said handle being movable in said elongated portion of said slot for moving said bolt means to its fastening and unfastening positions,
said handle being movable in said short portion of said slot to a locking position,
a second aperture formed through said plate means in line with said elongated portion of said slot between said first aperture and said edge of said plate means for receiving a member of a lock for locking said bolt means in its fastening position when said handle is in its locking position in said short portion of said slot.

4. The gate of claim 1, wherein:

said hollow elongated member is rectangular in a cross section transverse to its length such that it has four generally flat sides, said hollow elongated member having two of its opposite sides at its first end connected to said other side frame member, plate means connected to said first end of said hollow elongated member and having a first aperture formed therethrough defining said first opening of said hollow elongated member, said plate means having an edge extending beyond a third side of said hollow elongated member, a slot formed through the wall of said third side of said hollow elongated member, said slot having an elongated portion extending from said first end of said hollow elongated member toward said second end of said hollow elongated member, said slot having a short portion next to said plate means extending transversely from said elongated portion, a handle connected to said bolt means and extending through said slot, said handle being movable in said elongated portion of said slot for moving said bolt means to its fastening and unfastening positions, said handle being movable in said short portion of said slot to a locking position, and a second aperture formed through said plate means in line with said elongated portion of said slot between said first aperture and said edge of said plate means for receiving a member of a lock for locking said bolt means in its fastening position when said handle is in its locking position in said short portion of said slot.

5. A latch member for connection to a side frame member of a gate, comprising:

a hollow elongated member having first and second aligned openings formed through first and second opposite ends respectively, said hollow elongated member being rectangular in a cross section transverse to its length such that it has four generally flat sides, two opposite sides of said hollow elongated member being adapted to be connected to the side frame member of a gate, an elongated bolt means located in said hollow elongated member, said bolt means having a first end extending through said first opening and a second end extending through said second opening, plate means connected to said first end of said hollow elongated member and having a first aperture formed therethrough defining said first opening of said hollow elongated member, said plate means having an edge extending beyond a third side of said hollow elongated member, a slot formed through the wall of said third side of said hollow elongated member, said slot having an elongated portion extending from said first end of said hollow elongated member toward said second end of said hollow elongated member, said slot having a short portion next to said plate means extending transversely from said hollow elongated member, a handle connected to said bolt means and extending through said slot, said handle being movable in said elongated portion of said slot for moving said bolt means to fastening and unfastening positions, said handle being movable in said short portion of said slot to a locking position, a second aperture formed through said plate means in line with said elongated portion of said slot between said first aperture and said edge of said plate means for receiving a member of a lock for locking said bolt means in its fastening position when said handle is in its locking position in said short portion of said slot.

6. A latch member for connection to a side frame member of a gate, comprising:

a hollow elongated member having first and second aligned openings formed through first and second opposite ends respectively, said hollow elongated member being adapted to be connected to the side frame member of a gate, an elongated bolt means located in said hollow elongated member, said bolt means having a first end extending through said first opening and a second end extending through said second opening, plate means connected to said first end of said hollow elongated member and having a first aperture formed therethrough for defining said first opening of said hollow elongated member, said plate means having an edge extending beyond one side of said hollow elongated member, a slot formed through the wall of said one side of said hollow elongated member, said slot having an elongated portion extending from said first end of said hollow elongated member toward said second end of said hollow elongated member, said slot having a short portion next to said plate means extending transversely from said elongated portion, a handle connected to said bolt means and extending through said slot, said handle being movable in said elongated portion of said slot for moving said bolt means to fastening and unfastening positions, said handle being movable in said short portion of said slot to a locking position, a second aperture formed through said plate means in line with said elongated portion of said slot between said first aperture and said edge of said plate means for receiving a member of a lock for locking said bolt means in its fastening position when said handle is in its locking position in said short portion of said slot.

* * * * *